Feb. 15, 1955
J. JAMES
2,702,209
FRUIT COMBINE
Filed Dec. 7, 1950
4 Sheets-Sheet 1
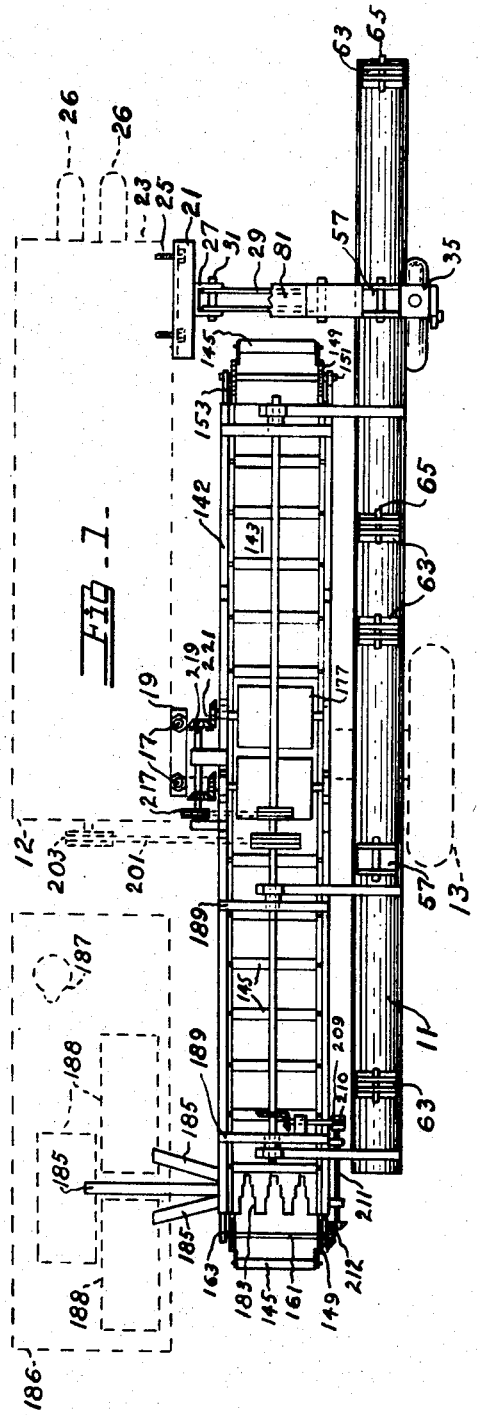
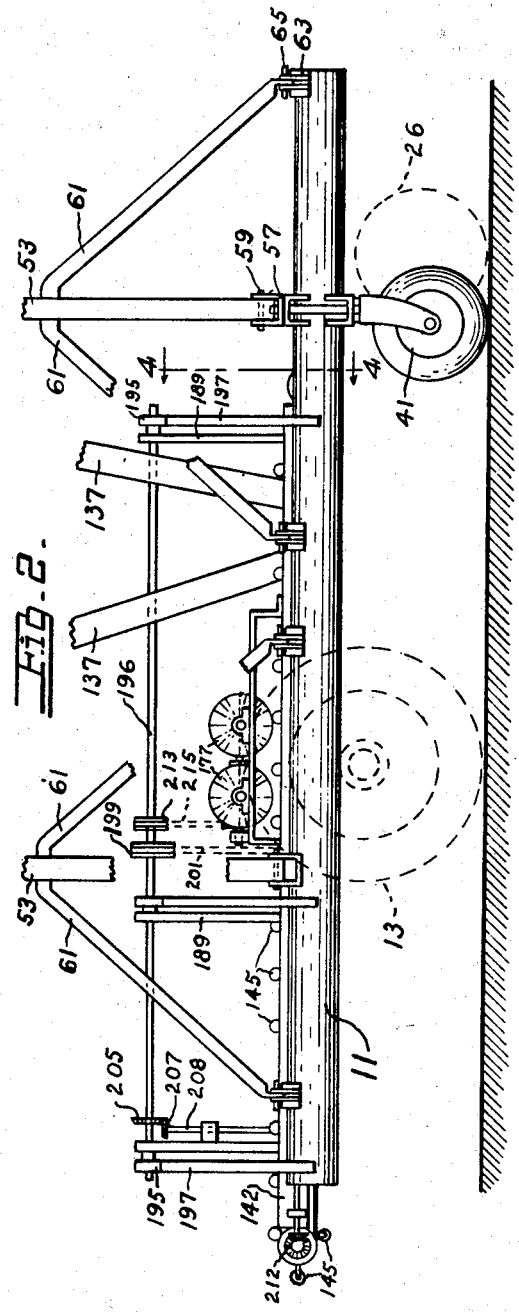
INVENTOR.
JOLLY JAMES
BY
*F. T. Hicks*
His Attorney

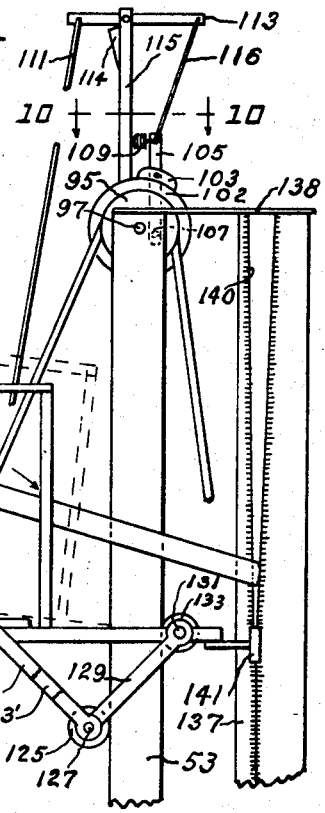

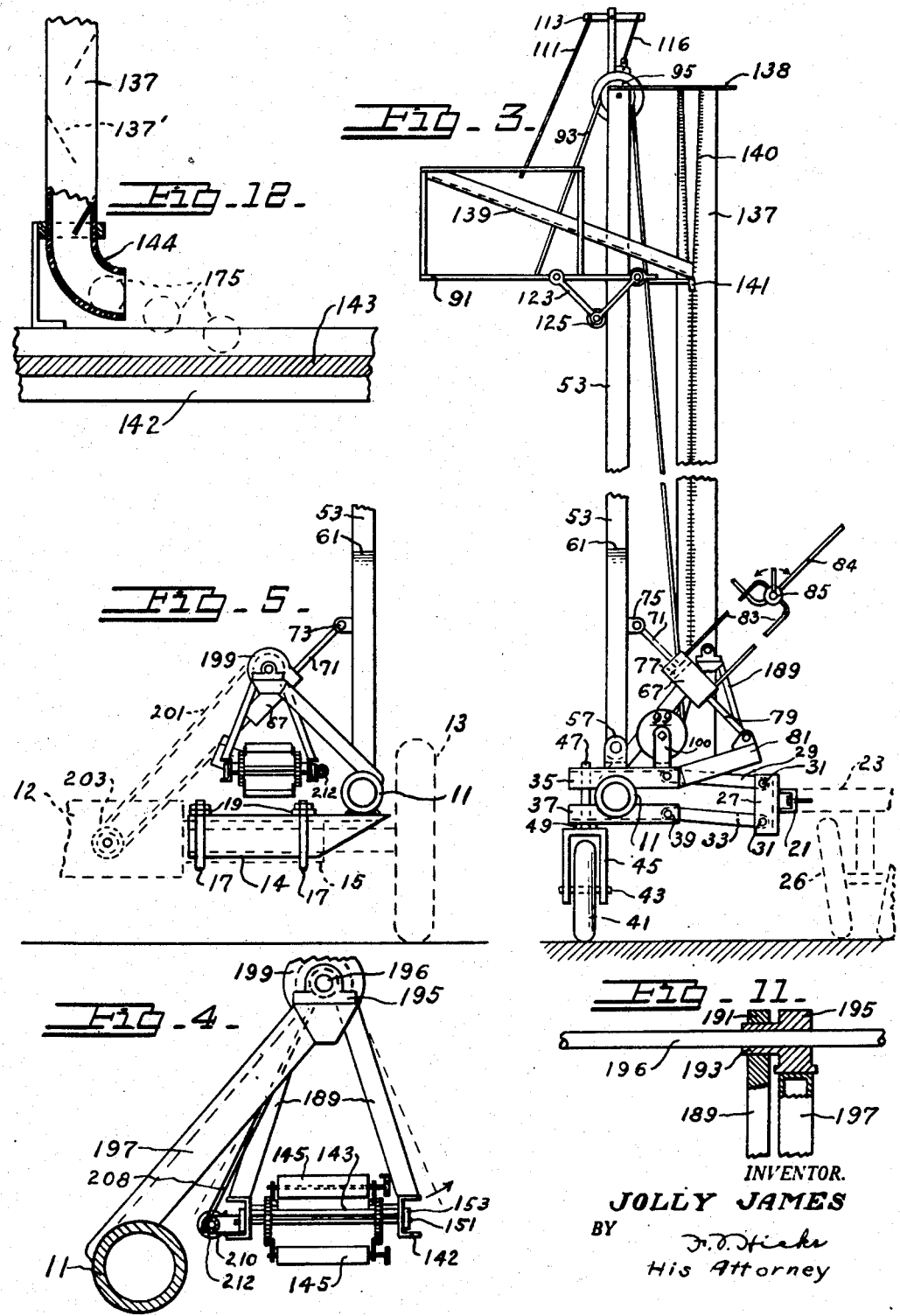

Feb. 15, 1955   J. JAMES   2,702,209
FRUIT COMBINE
Filed Dec. 7, 1950   4 Sheets-Sheet 4
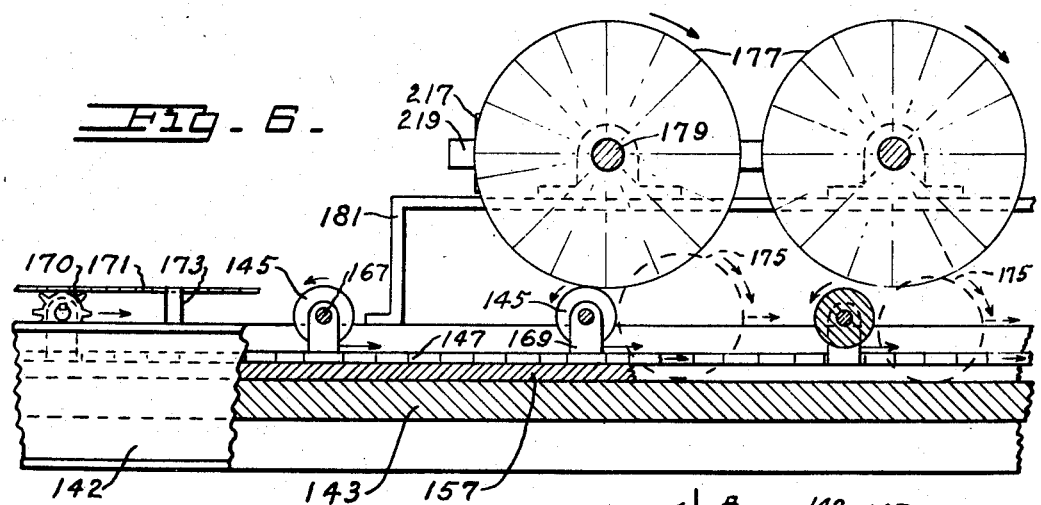
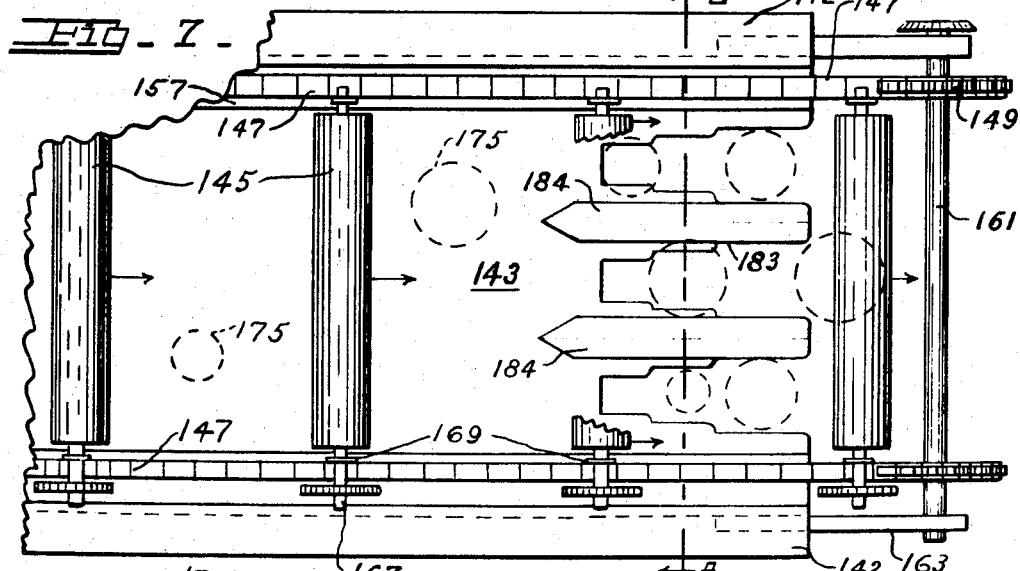
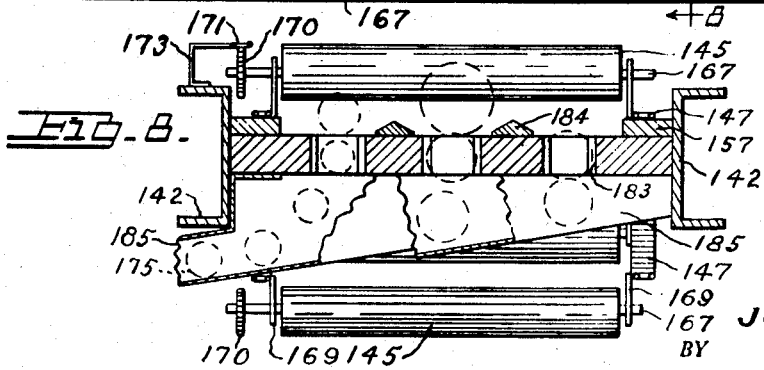
INVENTOR.
JOLLY JAMES
BY
His Attorney United States Patent Office 2,702,209
Patented Feb. 15, 1955

2,702,209

FRUIT COMBINE

Jolly James, Melvindale, Mich.

Application December 7, 1950, Serial No. 199,684

4 Claims. (Cl. 304—9)

The invention pertains to fruit-tree picking and tending apparatus, and also to such apparatus in the form of an attachment accessory for installation upon tractors.

It is an object of my invention to provide a fruit-tree tending combine to facilitate picking the fruit from fruit-trees accompanied by various other operations such as conveying, polishing, sorting and packing the fruit, and which may also be utilized for different operations at other seasons, such as spraying, pruning and thinning, so that the performance of such work may be expedited while also minimizing damage and injury to the trees and the fruit.

It is also an object of my invention to provide a fruit-tree tending combine in a structure which may be utilized as a tractor attachment accessory which may be readily installed upon conventional agricultural types of tractors, whereby apparatus is provided having convenient maneuverability for quickly and effectively approaching and encircling fruit-trees to be processed.

It is a further object of my invention to provide such a fruit combine which may be brought into combination with a tractor as a source of driving or controlling power, as well as for convenient transportation.

Further objects and advantages are within the scope of the invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of the invention, in which similar reference characters are applied to corresponding elements throughout, and wherein:

Fig. 1 is a plan view showing the improved fruit tree processing apparatus, partially broken away, the staffs, pivotal braces and the overhanging parts being omitted, and parts, including attached tractor structure, being represented in dotted lines;

Fig. 2 is a side elevational view showing the right-hand side of the fruit tree attending apparatus, the upper portions of staffs being broken away and parts being represented in dotted lines;

Fig. 3 is a front end elevational view of the device;

Fig. 4 is an enlarged fragmentary sectional view on line 4—4, in Fig. 2;

Fig. 5 is a rear end elevational view of the apparatus, the supporting and driving tractor being shown in dotted lines;

Fig. 6 is an enlarged side elevational view of the conveyor, partially broken away for showing the fruit polishing means and cooperative adjacent portion of the conveyor, and partially diagrammatic for illustrating operation;

Fig. 7 is an enlarged fragmentary plan view of the rear portion of the conveyor showing the fruit sorter or grader with adjacent conveyor elements, and partially diagrammatic for illustrating its operation;

Fig. 8 is a cross-sectional view on line 8—8 in Fig. 7;

Fig. 9 is an enlarged side elevational view, showing one of the workman supporting platforms and the upper portion of an adjustable supporting staff whereon the platform is also further adjustable, with dotted lines and arrows added for diagrammatically illustrating the adjusting operation thereof;

Fig. 10 is a cross-sectional view taken on line 10—10 on Fig. 9;

Fig. 11 is an enlarged fragmentary view showing the pivotal or swinging support for the conveyor;

Fig. 12 is an enlarged fragmentary view showing the lower end of the flexible fruit tube arranged for delivering fruit upon the conveyor table;

Fig. 13 is a diagrammatic and end elevational view of the tractor and the tree processing apparatus, with dotted line arcs applied for showing how all levels of a tree can be easily reached by the workmen who are carried at different convenient positions; and Fig. 14 is a diagrammatic plan view representing the same apparatus executing a movement for encircling a tree to be processed as represented by the dotted circles and arrows.

Referring more specifically to Figs. 1 and 3 of the drawing, where I have illustratively disclosed my fruit combine tractor attachment, it will be seen that I provide a main support base 11 of a narrow elongated form. The base 11 may be readily fabricated of structural steel beams, as will be readily understood, although it may be most readily provided in the simple structural form of a large steel tube 11, as shown. Such a tubular base must be of a length suitable to be disposed along one side of a general purpose type of agricultural tractor 12 and of a diameter and thickness suitable for receiving structural members attached thereto and having substantial strength and rigidity for the support of such attached members. Such tractors are commonly provided with extendable rear wheels 13 which may be off-set to a considerable distance from the side of the tractor. My support base 11 preferably passes over and is supported on the rear axle of such a tractor, just inside of the right-hand rear wheel, as shown. Attachment is by means of a piece of inverted channel iron 14, on which the tubular base 11 is secured, as by welding. The inner end of this channel 14 fits down over the axle housing 15 of the tractor and it is firmly clamped thereto by means of U-shaped clamp bolts 17 whereby a clamping plate 19 may be drawn down snugly upon the top of the channel 14 to hold it firmly upon the tractor axle housing.

The front end of the base 11 is provided with a front clamping member 21, which may be a piece of channel iron, and this is secured firmly in a horizontal position along the side of the front end of the tractor chassis or frame 23, as by screws or bolts 25 turned threadably thereinto, at a point which may be adjacent the tractor front wheels 26. Carried by the front clamping member 21 is a link bracket 27 which is a piece of channel iron secured firmly thereto in a vertical position, as by welding. As may be seen in Fig. 3, two upper links 29 enters the upper end of this link bracket 27 where it is pivotally secured by a pivot pin 31 extending therethrough. Similarly, one end of two lower links 33 enters the lower end of this link bracket and is secured therein by means of another transverse pivot pin 31. As Fig. 3 also shows, the extending or swinging ends of the upper and lower links 29 and 33 are connected pivotally to upper and lower wheel brackets 35 and 37, respectively, which extend secured across the top and the bottom of the tubular base member 11. These wheel brackets are preferably pieces of channel iron with the yokes or intermediate webs turned out away from the base tube 11 and the side webs of the channels being cut out to fit around the upper and lower sides of the tubular base member 11 whereto firm attachment is made, as by welding. The swinging ends of the upper and lower links enter the adjacent ends of the respective wheel brackets and are pivotally secured therein on transverse pivot pins 39 extending also through the channel cross-section sides of these wheel socket brackets. The other ends of said wheel brackets project over the outer side of the base tube 11 and serve also to mount the front end of the elongated base 11 upon a ground wheel 41 which may rotate on an axle shaft 43 extending between the spaced arms 45 of a fork the stem 47 of which extends upwardly through suitable socket apertures provided in the outwardly extending ends of said wheel socket brackets. The intermediate web of the channel-cross-section of the lower wheel bracket 37 being turned downwardly provides a bearing surface to rest upon the yoke of the wheel fork, whereupon a bearing ring 49 may be disposed to form additional bearing surface, if desired. The wheel 41 may be of any conventional construction, provided with a pneumatic tire, in a manner usual with tractor front wheels or other agricultural machines, as will be understood. The arms 45 between which the wheel 41 rotates, are preferably curved slightly toward the rear of the machine, as shown in Fig. 2, for caster action so that the wheel will trail smoothly along beside the tractor.

In this arrangement for mounting the front end of the base 11 of the fruit combine attachment, the ground wheel 41 thereof rolls smoothly along the ground and over irregularities thereof, the link attachment holding it securely to the front end of the tractor while permitting relative movement much after the fashion of the so-called "knee-action" mounting of one of the front wheels of an automobile.

As Figs. 2 and 3 show, staffs 53 are provided which rise adjustably from the main base 11 to carry workman or fruit-picker platforms 91 which may be quickly set or adjusted to the most convenient position for processing a tree as it is being approached by the tractor carried appliance. Such staffs 53 may be made of any suitable structural steel such as channel, square or tubular cross-section, and the lower ends are pivotally secured in pivot brackets 57 welded on top of the base tube 11 and the upper wheel bracket 35 and having pivot pins 59 extending therethrough to securely anchor the lower ends of the staffs. The staffs may only be adjusted by pivotal movement laterally to the base 11, and longitudinal movement is eliminated by braces 61 the upper ends of which are secured at intermediate points upon the staffs. The lower portions of these braces incline downwardly and the lower ends approach the base 11 at points substantially spaced from the lower ends of the staffs where pivotal brackets 63 are secured on the base with pivot pins 65 holding the lower ends of the braces pivotally thereon.

To set and hold the staffs vertically, or at any desired laterally inclined angular position, each such staff is provided with an actuator or power device 67, connected to the staff at an intermediate point, as may be seen in Fig. 3. As shown, one suitable form of such an actuator is a hydraulic cylinder 67 having a mounting rod 79 extending axially from the closed end of the cylinder. From the piston 77 in the cylinder a connecting rod 71 passes out of the head in the other end of the cylinder, which may have a well known stuffing box (not shown) passing the piston rod in a sealed relation therethrough. The mounting rod 79 extends to be pivotally anchored on any firm abutment or support, such as the lateral abutment 81 extending from the base. This lateral abutment is readily provided by welding a piece of structural steel, such as channel iron, in coextending relation on one end of the upper wheel bracket 35 and inclined slightly upward so as to avoid interference with the oscillations of the upper link 29 which connects pivotally thereinto. From the ends of the actuator cylinder 67 connection pipes or tubes 83 extend for connection selectively to any suitable source 84 of fluid under pressure by means of a manual valve 85 convenient to the operator of the tractor. Tractors are commonly provided with such a pressure source for lifting plows, discs, and performing other operations.

As seen in Fig. 3, also Figs. 9 and 10, a platform 91 is slidably disposed upon each adjustable staff 53 for supporting a workman who is to be carried to a convenient position adjacent to and around a tree for picking fruit therefrom, or for pruning, spraying or other tree tending operations. To support the weight of the platform 91 and the workman, I provide a cable 93 secured to the platform and passing up over a cable pulley 95 rotatively supported upon a shaft 97 in the upper end of the staff, and extending down to a balancing device 99. The balancing device 99 is preferably a well known coiled spring cable reeling device of a conventional type, as shown, supported on the base between a pair of brackets 100 which non-rotatively support the shaft thereof. The counter-balancing device 99 is so selected, or adjusted, that it will not quite balance the weight of the platform and the workman.

To hold the platform at any level, a brake drum 102 is provided in connection with the pulley 95 and a brake shoe 103 engages thereon. This brake shoe 103 is pivotally mounted upon a brake lever 105 and the latter has one end pivotally mounted on a pivot pin 107 in the upper end of the staff 53. The pivot pin 107 is at an eccentric position relative to the pulley and drum shaft 95 so that rotation of this brake drum in a counter-clockwise direction causes the brake shoe to grip the brake drum and restrict rotation of the drum, aided by the action of a spring 109 which draws the brake shoe to the brake drum. When the workman desires to descend, he merely releases this brake and lets the platform slide down to a lower level. This is accomplished by pulling down on a brake cord 111 attached to one end of a lever 113 supported at a higher level on an extension rod or pipe 115, which is secured in the upper end of the staff, as by welding it thereinto. Pulling down the brake cord 111 draws up a cable 116 extending from the other end of the lever 113 and pulls the brake shoe 103 away from the brake drum. When the desired lower level has been reached, the workman merely releases the brake cord and the spring 109 applies the brake and holds the platform at this desired level. When the workman wishes to elevate himself, he merely grasps the brake cord 111 hanging down from the lever 113 and pulls forcefully against the stop 114 until he has attained the desired elevated position. This operation is easily accomplished because the weight is already partly balanced by the counter-balancer, and pulling on the cord 111 releases the brake, as previously explained, so the brake is held off while the worker is lifting himself.

When the staff 53 is inclined outwardly from the base, as shown in Fig. 9, the workman on the platform can maintain it at a level position so that he can work more comfortably and effectively. This he accomplishes by grasping a lever 117 and rotating it clockwise to a new position, as indicated by the arrows and dotted lines. This tilts the outer edge of the platform 91 upwardly to the new dotted line position so that by tilting the platform relatively toward the staff, it is maintained level. For this purpose the lower end of the lever 117 has a radial arm 119 projecting radially from the pivot shaft 121 which supports the lever secured firmly thereon. A link 123 pivotally joins the outer end of this radial arm down to an outer roller 125, which rests against the outer side of the staff. For well balanced support on the staff, the lever shaft 121 passes through under the platform and the other end has a corresponding radial arm connecting through a similar link 123' to the opposite end of outer roller 125. This outer roller 125 may be made of wood, metal, rubber or other material, and it has a rod 127 extending centrally therethrough. This central rod 127 serves for connection with the links 123 from the control lever and it also connects with two links 129 extending on opposite sides of the staff 53 and connecting on the ends of a rod 131 through an inside roller 133 on the inner side of the staff. The rod 131 from this inside roller also extends through the ends of a pair of cross-pieces 135 which pass from under the platform on opposite sides of the staff to guide the movements of the platform along the staff, while the outer roller 125 in assembly therewith is effective both for guiding the movements of the platform along the staff as well as for controlling the level or inclined position of the platform relative to the staff.

To receive picked fruit and conduct it safely down from the platform, I provide a flexible conduit 137 of canvas or other flexible material having its upper open end secured to the upper end of the staff by a bracket 138, as seen in Fig. 3. A trough 139 is mounted in an inclined position in the platform with its lower end entering the flexible fruit conduit 137 which has its adjacent side split for this purpose and provided with zipper fasteners 140 controlled by a zipper slide 141 attached to the inner end of one of the cross-pieces 135 and as the platform moves to a lower level the side of the flexible tube is opened to receive the end of the inclined trough. As the platform and the inclined trough 139 are again lifted to a higher level, the zipper slide 141 is also lifted and again closes the side of the flexible fruit tube up to a point just under the inserted end of the inclined trough, at its elevated position.

For receiving the picked fruit from the lower ends of such flexible tubes 137, a conveyor is provided which extends along the base from the front to the rear. At the bottom ends the fruit tubes 137 are terminated in a soft rubber elbow 144 and secured for delivering the fruit upon the conveyor, as shown in Fig. 12. Also downwardly inclining baffles 137' may be secured in spaced inclining relation to retard the fruit as it falls down the tube and thus to avoid harm.

The fruit conveyor, as may be seen in Figs. 1 through 8, has elongated channel side members 142 supporting therebetween a table 143 on which the fruit is rolled along by means of cross-rollers 145. The cross-rollers 145 are carried along over the table between the upper runs of a pair of endless machine chains 147, which cause these rollers to pass from the front to the rear end of the table. At the front the two chains pass around two chain wheels 149 supported upon a shaft 151 the ends of which are supported rotatively in bearings 153 extending from the front ends of the conveyor side channels 142. The conveyor table 143 is provided with side pieces 157 secured along the side edges adjacent the channels 142 to provide structural rigidity as well as serving as guide rails for confining the rolling fruit as it moves along to the rear. The upper runs of machine chains slide along over these side rails 157 and run over rear chain wheels 149 secured on a rear shaft 161 suitably disposed across the rear of the conveyor in bearings 163 extending from the rear ends of the channels, as shown in Fig. 7.

Picked fruit is deposited upon the frontward portion of the conveyor table from the lower ends of the soft flexible fruit tubes 137 and it is moved along toward the rear by the cross-rollers 145 between the two runs of chain passing over the table. Each end of each cross-roller 145 has an end shaft 167 exposed for rotative support in a bearing bracket 169 secured at its lower end to the inner side of one of the links of the machine chain. Each one of the cross-roller bearing brackets 169 may be heavy gauge sheet metal secured to the inner side of the inside leg of the link, as by welding. The cross-rollers 145 may be made of wood or metal and it is desirable that these be suitably padded and covered, or coated, with a soft material to avoid injury to the fruit. Also a simple suitable structure is that of the common washing machine wringer rollers comprising a roll of rubber having a shaft extending therethrough and projecting from both ends, in a well known manner. The conveyor table is also preferably covered with a sheet of soft padding material, such as rubber, cloth, or a coating of any suitable soft plastic or other material, in order to eliminate risk of producing bruises and rub marks on the fruit.

To entirely eliminate risk of injury to the surface of high grade fruit, and also to turn the fruit as it moves along so that blemishes already on the fruit can be easily seen, I provide means for rotating the cross-rollers reversely relative to their movement along over the table. This causes the fruit to roll more freely along the table.

As may be seen more clearly in Figs. 6, 7 and 8, this is readily accomplished by providing a small chain wheel 170 on the outer end of one of the end shafts from each cross-roller and cooperative with a stationary piece of chain 171 stretched along between brackets 173 rising from the adjacent side of the conveyor and supporting this piece of chain to mesh with the upper sides of these small chain wheels. As the cross-rollers 145 are carried along toward the rear of the table, rotation is imparted to these rollers in a counter-clockwise direction, as viewed in Fig. 6, and, as indicated by the arrows thereon this tends to roll the fruit 175 (represented by dotted circles) clockwise and toward the rear end of the conveyor. This eliminates the possibility of causing bruises and rub marks on the fruit, so that high grade fruit can be handled safely by the fruit combine.

As Fig. 6 shows, cleaning and polishing rolls 177 are provided having shafts 179 rotatively supported in bearing brackets 181 rising from the sides of the conveyor and said shafts extend through these brackets to be connected with driving means, to be described. Such polishing rolls may be common rotary brushes having bristles of suitable texture, or well known rollers provided with projecting discs of suitable textile or fibrous materials, as desired. Such polishers are preferably disposed to rotate on axes of rotation which extend perpendicular to the path of movement of the fruit, and rotate in a direction such as to be against the rotation of the fruit as it is rolled along on the conveyor. As the fruit rolls along on the table its rotation opposes the rotating polishers and as a result it is very thoroughly cleaned and polished.

As the cleaned and polished fruit 175 is moved still further toward the rear end of the conveyor it is classified and sorted by means of sorting slots 183 formed of varying widths according to the sizes of fruit to be separately selected and packed. As shown, there are three different widths of these sorting slots, but it is to be understood that different numbers and widths of these slots may be provided to suit the particular fruit to be handled by the machine. These sorting slots 183 are connected together in a plurality of series or rows all opening progressively from the narrowest slot through the intermediate slot and then into the widest slot. This sorter very effectively separates the fruit of different sizes without bruising the fruit, as the fruit merely drops down lower as it passes into each successive wider slot without being at any time pushed up and out of a slot. The last or widest sorter slot opens out through the rear end of the conveyor table. To guide the fruit toward these sorting slots, fruit diverters 184 are provided therebetween. These may be pads of rubber, or other soft material, secured on top of the conveyor table at suitable positions. This sorter arrangement cooperates very effectively with the reversely turning cross-rollers of the conveyor to sort the fruit without bruising or marking it and the grading of the fruit is not adversely affected by being conveyed and processed through the fruit combine.

Fruit receiving troughs 185, preferably lined with suitable soft material, are disposed under the sorting slots 183 so as to receive the fruit as it falls through separated into different sizes. The fruit receiving troughs 185 are inclined so that the processed fruit rolls down and toward the tractor side of the conveyor. An attendant riding a seat 187, on a trailer 186 towed behind the tractor, as represented in Fig. 1, inserts suitable packing boxes or crates 188 under the lower outer ends of the fruit receiving troughs 185 and attends to packing the fruit.

To avoid unevenness of the ground interfering with the operation of the fruit conveyor and its cooperative operations of cleaning, polishing and sorting, I provide for supporting the conveyor so that it is maintained fairly level at all times.

This is accomplished by providing for the support of the conveyor in a suspension arrangement consisting of pairs of suspension arms 189 which rise from the channel side members of the conveyor in an inverted V-shaped formation, as may be seen in Figs. 1, 3, 4, 5 and 11. The upturned apex of each such V-suspension is provided with a centrally disposed bearing 191 which rests rotatively upon a sleeve 193 projecting axially from a main bearing 195 which also journals a main shaft 196. The main bearings 195 are supported on the upper ends of main support arms 197 which rise inclined from the base 11, the lower ends of these arms being attached firmly thereto, as by welding, for example. The main support arms 197 may be made of heavy structural members such as channel iron.

Driving is accomplished through the main shaft 196 which is driven through any suitable power transmission means from the power take-off, commonly provided upon tractors. This may be readily accomplished by providing a driven belt pulley 199 secured upon the main shaft 196 at a suitable position for receiving a belt 201 driven from the power pulley 203 of the tractor. From the main shaft 196, suitable power transmission means drives the fruit conveyor. This may be readily done by providing a bevel gear 205 secured on the rear portion of the main shaft 196 for driving a bevel gear 207 on a shaft 208 extending down along one suspension arm to the outer side of the conveyor where it drives a worm 209 meshing with a worm wheel 210 on a shaft 211 driving through bevel gears 212 to the rear conveyor shaft 161 for driving the two machine chains 147 of the conveyor. The polishers may be driven from a belt pulley 213, secured at an intermediate position on the main shaft 196 to drive a belt 215 passing around a pulley 217 on a counter-shaft 219. The counter-shaft 219 is journalled along the side piece of the bracket 181 and drives the two polishers through bevel gears 221 of suitable driving ratio. Where belts are used, such as the polisher driving belt 215 and the power take-off belt 201, these are preferably of the conventional V-type, with the cooperative pulleys also of suitable sizes for the speeds desired. Due to the conveyor being driven from this main shaft 196 passing axially through the bearing 195, which also serves as a suspension support, the swinging of the conveyor from side-to-side will not disturb the driving connections.

Operation

The fruit tree tending apparatus, while not in use, is preferably disposed upon a dock (not shown) of suitable height so that the tractor can be conveniently driven to a position alongside of the elongated base 11 with the extended rear axle of the tractor under the rear end of the base. The rear end of the base is then secured on the tractor by clamping the channel iron piece down upon the rear axle with the clamping bolts and by securing the front end to the tractor chassis or frame 23 by bolts 25, as previously described.

Fruit pickers, or workmen with suitable equipment for spraying, pruning, thinning, or other tree-tending operations, take their places in the platform supports which are readily adjusted to desirable elevations, as the tractor approaches trees to be processed. While the individual workmen may elevate or lower their platforms the tractor operator has control of the angular positions of the staffs 53, as previously described.

As Fig. 13 shows, the workmen carrying platforms are adjusted to and carried at positions which bring the upper portions of the tree 240, to be processed, within convenient reach for performance of the desired operations. Driving the tractor around a circular path of suitable radius, as shown in Fig. 14, provides access to all sides of the tree, and in one encircling movement the work can be very thoroughly completed, without skipping or missing one side or part of the tree. Because of the convenient proximity of the workmen to all parts of the trees, all the tree tending operations are performed easily, quickly and effectively, without danger of injury to the trees.

When used for fruit picking, the picked fruit is conveniently placed in the inclined trough on each platform. From this point the picked fruit passes down through the flexible fruit tubes 137 to the conveyor table and, as previously described, the fruit is moved along the table by reversely turning cross-rollers which impart a free rolling movement to the fruit to avoid causing bruises or friction marks on the fruit. Also this arrangement exposes all sides of the fruit for thorough inspection, and fruit having natural blemishes can be picked off, which is a feature of particular utility when my improved conveyor is used in stationary apparatus. As the fruit traverses the conveyor table with a free rolling movement, it passes under the rotary polishers which effectively clean and polish it. Approaching the rear end of the conveyor table the fruit rolls in the sorter slots and drops through the slot which is large enough to pass each particular piece of fruit, or passes over the rear end of the table. The polished and sorted fruit is then collected and packed, as previously described, and these operations are performed by a continuous operation from the time the fruit is picked and dropped into the inclined trough.

It is apparent that within the scope of the invention modifications and different arrangements may be made other than herein disclosed, and the present disclosure is illustrative merely, the invention comprehending variations thereof.

What is claimed as the invention is:

1. In tree tending apparatus the combination of, a base adapted to be portably supported for convenient approach to trees to be processed, a worker supporting staff, means pivotally supporting said staff on said base so that said staff rises therefrom vertically or at various angular positions relative thereto, means for holding said staff at a desired angular relation on said base, a worker support platform, support means movably supporting said platform on said staff for adjustment to various positions along the staff, control means convenient to a workman for moving the platform to and holding it at various set positions as desired by the workman, and said control means comprising balancing means for counterbalancing a sufficient portion of the weight of the workman on the platform so that a workman can raise himself with a slight effort, a brake at an elevated position for holding the platform at any set position, and a brake release cord extending down to be within reach of the workman on the platform so that a light pull thereon releases the brake for lowering the platform and a strong pull, greater than the unbalanced weight of the workman, causes the platform to be elevated.

2. A tree tending tractor attachment accessory comprising, a tubular base of a length suitable to be disposed along one side of a general purpose agricultural tractor with attachment to the front end thereof while resting upon the rear axle at one side of the tractor, said tubular base having a diameter of suitable size to receive structural members attached thereon and to provide substantial strength and rigidity for the support of such attached members, connecting means for connecting the front end of said tubular base to the front end of a tractor, a platform supporting staff rising from said base, a workman's platform movably disposed upon said staff, elevation control means for setting the platform to any desired position on said staff for the convenience of a tree tending workman, pivotal support means on said base for pivotally mounting the lower end of the staff thereon, and actuator means for adjusting and supporting said staff at any desired angular position from said base for the convenience of a tree tending workman.

3. A tree tending tractor attachment accessory in accordance with claim 2 and further characterized by having a ground engaging wheel for carrying the front end of said tubular base, and said connecting means including a pivotal linkage arrangement so that the front end of the tubular base is free to move up and down adjacent the front end of the tractor as said ground engaging wheel passes over irregular ground surfaces.

4. A tree tending tractor attachment accessory in accordance with claim 3 and further characterized by having a caster arrangement connecting said ground wheel to carry the front end of said tubular base so that the wheel moves smoothly along to follow the movements of a tractor to which it is attached.

References Cited in the file of this patent

UNITED STATES PATENTS

| Number | Name | Date |
|---|---|---|
| 182,380 | Miller | Sept. 19, 1876 |
| 356,650 | Landgraf | Jan. 25, 1887 |
| 566,793 | Parson | Sept. 1, 1896 |
| 581,321 | Wilson | Apr. 27, 1897 |
| 659,197 | Allen | Oct. 2, 1900 |
| 736,947 | Ekman | Aug. 25, 1903 |
| 954,935 | Crawford | Apr. 12, 1910 |
| 1,190,067 | Zenge | July 4, 1916 |
| 1,332,495 | Graham | Mar. 2, 1920 |
| 1,631,925 | Demarest | June 7, 1927 |
| 1,646,701 | Moe | Oct. 25, 1927 |
| 1,773,525 | Draper | Aug. 19, 1930 |
| 1,924,098 | Bates | Aug. 29, 1933 |
| 1,974,572 | Laflin | Sept. 25, 1934 |
| 2,073,837 | Ghent | Mar. 16, 1937 |
| 2,232,890 | Stillwagon | Feb. 25, 1941 |
| 2,272,677 | Meneray | Feb. 10, 1942 |
| 2,296,645 | Marsden | Sept. 22, 1942 |
| 2,376,875 | Honig | May 29, 1945 |
| 2,386,881 | Phillips | Oct. 16, 1945 |
| 2,410,030 | Horni | Oct. 29, 1946 |
| 2,428,184 | Swindler | Sept. 30, 1947 |
| 2,448,630 | Schutz | Sept. 7, 1948 |
| 2,450,152 | Miller | Sept. 28, 1948 |
| 2,503,416 | Russell | Apr. 11, 1950 |
| 2,536,507 | Lang et al. | Jan. 2, 1951 |
| 2,562,634 | Nelson | July 31, 1951 |
| 2,606,078 | Brock | Aug. 5, 1952 |
| 2,611,455 | Woods | Sept. 23, 1952 |

FOREIGN PATENTS

| Number | Country | Date |
|---|---|---|
| 5,882 | Great Britain | A. D. 1911 |